United States Patent
Ozawa et al.

(10) Patent No.: US 10,391,629 B2
(45) Date of Patent: Aug. 27, 2019

(54) AIR PUMP APPARATUS USING ELECTRIC ACTUATOR AND AIR PUMP SYSTEM

(71) Applicant: THK CO., LTD., Tokyo (JP)

(72) Inventors: Koji Ozawa, Tokyo (JP); Masaki Nagatsuka, Tokyo (JP); Munehiro Iwata, Tokyo (JP); Aiko Tagawa, Tokyo (JP); Miki Tobita, Tokyo (JP); Takashi Naito, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/739,416

(22) PCT Filed: Jun. 22, 2016

(86) PCT No.: PCT/JP2016/068457
§ 371 (c)(1),
(2) Date: Dec. 22, 2017

(87) PCT Pub. No.: WO2016/208604
PCT Pub. Date: Dec. 29, 2016

(65) Prior Publication Data
US 2018/0185999 A1    Jul. 5, 2018

(30) Foreign Application Priority Data

Jun. 23, 2015    (JP) .................................. 2015-125573

(51) Int. Cl.
*F04B 35/04*    (2006.01)
*B25J 9/02*    (2006.01)
(Continued)

(52) U.S. Cl.
CPC ............... *B25J 9/023* (2013.01); *B25J 9/026* (2013.01); *B25J 15/0206* (2013.01);
(Continued)

(58) Field of Classification Search
CPC .......... F04B 39/12; F04B 35/04; F04B 39/00; F04B 49/06; F04B 39/121; B25J 15/0206; B25J 9/026; B25J 15/0683; B25J 9/023
See application file for complete search history.

(56) References Cited

U.S. PATENT DOCUMENTS 5,166,563 A * 11/1992 Bassine ................. F04B 35/045
128/205.18
5,639,226 A    6/1997 Boutrup et al.
(Continued)

FOREIGN PATENT DOCUMENTS

CN    1119035 A    3/1996
JP    04-180102    6/1992
(Continued)

OTHER PUBLICATIONS

International Search Report, PCT/JP2016/068457, dated Aug. 30, 2016.
(Continued)

*Primary Examiner* — Abiy Teka
(74) *Attorney, Agent, or Firm* — Young & Thompson (57) ABSTRACT

An air pump apparatus is provided which uses an electric actuator that can electrically operate a pneumatic device such as a suction pad or air chuck. The air pump apparatus includes an air cylinder having a built-in piston, and an electric actuator configured to move the piston linearly and relatively to the air cylinder, using the electric motor as a drive source. Air under negative pressure and/or positive pressure generated by the electric actuator causing the piston of the air cylinder to move linearly is used to operate a pneumatic device.

9 Claims, 9 Drawing Sheets

(51) Int. Cl.
- *F04B 39/00* (2006.01)
- *F04B 39/12* (2006.01)
- *B25J 15/02* (2006.01)
- *B25J 15/06* (2006.01)
- *F04B 41/00* (2006.01)
- *F04B 49/06* (2006.01)
- *F04B 9/02* (2006.01)
- *F04B 17/03* (2006.01)

(52) U.S. Cl.
CPC ....... *B25J 15/0616* (2013.01); *B25J 15/0683* (2013.01); *F04B 35/04* (2013.01); *F04B 39/00* (2013.01); *F04B 39/12* (2013.01); *F04B 39/121* (2013.01); *F04B 41/00* (2013.01); *F04B 49/06* (2013.01); *F04B 9/025* (2013.01); *F04B 17/03* (2013.01)

(56) References Cited

U.S. PATENT DOCUMENTS

| | | |
|---|---|---|
| 2004/0208750 A1 | 10/2004 | Masuda |
| 2013/0124184 A1 | 5/2013 | Sakaguchi et al. |
| 2014/0318298 A1 | 10/2014 | Inoue |
| 2015/0143920 A1* | 5/2015 | Mackenzie ............ G01B 13/10 73/861.52 |

FOREIGN PATENT DOCUMENTS

| | | |
|---|---|---|
| JP | 09-296778 | 11/1997 |
| JP | 09296778 A * | 11/1997 |
| JP | 2004-293443 | 10/2004 |
| JP | 2009-062870 | 3/2009 |
| JP | 2011-192016 | 9/2011 |
| JP | 2014-213437 | 11/2014 |

OTHER PUBLICATIONS

Chinese Office Action issued in Application 201680035369.3, dated Jun. 15, 2018 with English Translation.

* cited by examiner

AIR PUMP APPARATUS USING ELECTRIC ACTUATOR AND AIR PUMP SYSTEM

TECHNICAL FIELD

The present invention relates to an air pump apparatus using an electric actuator that generates negative pressure and/or positive pressure of gas to operate a pneumatic device, and an air pump system.

BACKGROUND ART

Pneumatic devices such as suction pads and air chucks operate using compressed air as an energy source. The compressed air is created by a compressor compressing atmospheric air, and then supplied to a pneumatic device that requires the compressed air through a pipe.

In a manufacturing facility of a factory or the like, pneumatic devices such as suction pads and air chucks may be used in combination with a three-axis robot that moves the pneumatic devices in the X-, Y-, and Z-axis directions. In recent years, in terms of the three-axis robot, an air cylinder or hydraulic cylinder is replaced with the electric actuator using an electric motor to save energy (refer to, for example, Patent Literature 1).

CITATION LIST

Patent Literature

Patent Literature 1: JP 2014-213437 A

SUMMARY OF INVENTION

Technical Problem

However, even if the three-axis robot is replaced with the electric actuator, the pneumatic device such as a suction pad or air chuck requires the compressed air. There is an issue that new large equipment such as a compressor and a compressed air pipe needs to be installed under an environment where air cannot be used (for example, an examination room).

The present invention is for solving the above issue, and an object thereof is to provide an air pump apparatus using an electric actuator that can electrically operate a pneumatic device such as an air chuck or suction pad.

Solution to Problem

To solve the problem, an aspect of the present invention is an air pump apparatus using an electric actuator, including: an air cylinder having a built-in piston; and an electric actuator configured to move the piston linearly and relatively to the air cylinder, using an electric motor as a drive source, wherein air under negative pressure and/or positive pressure generated by the electric actuator causing the piston to move linearly is used to operate a pneumatic device.

Advantageous Effects of Invention

According to the present invention, an air cylinder is operated by an electric actuator. Accordingly, it is possible to generate negative pressure and/or positive pressure of air and electrically operate a pneumatic device such as a suction pad or air chuck.

DESCRIPTION OF EMBODIMENTS

An embodiment of an air pump apparatus using an electric actuator, and an air pump system of the present invention is described in detail hereinafter with reference to the accompanying drawings. However, the air pump apparatus using the electric actuator and the air pump system of the present invention can be embodied in various modes, and are not limited to the embodiment described in the present description. The embodiment is provided with the intention of enabling those skilled in the art to fully understand the scope of the invention by sufficiently disclosing the description.

Figure 1:
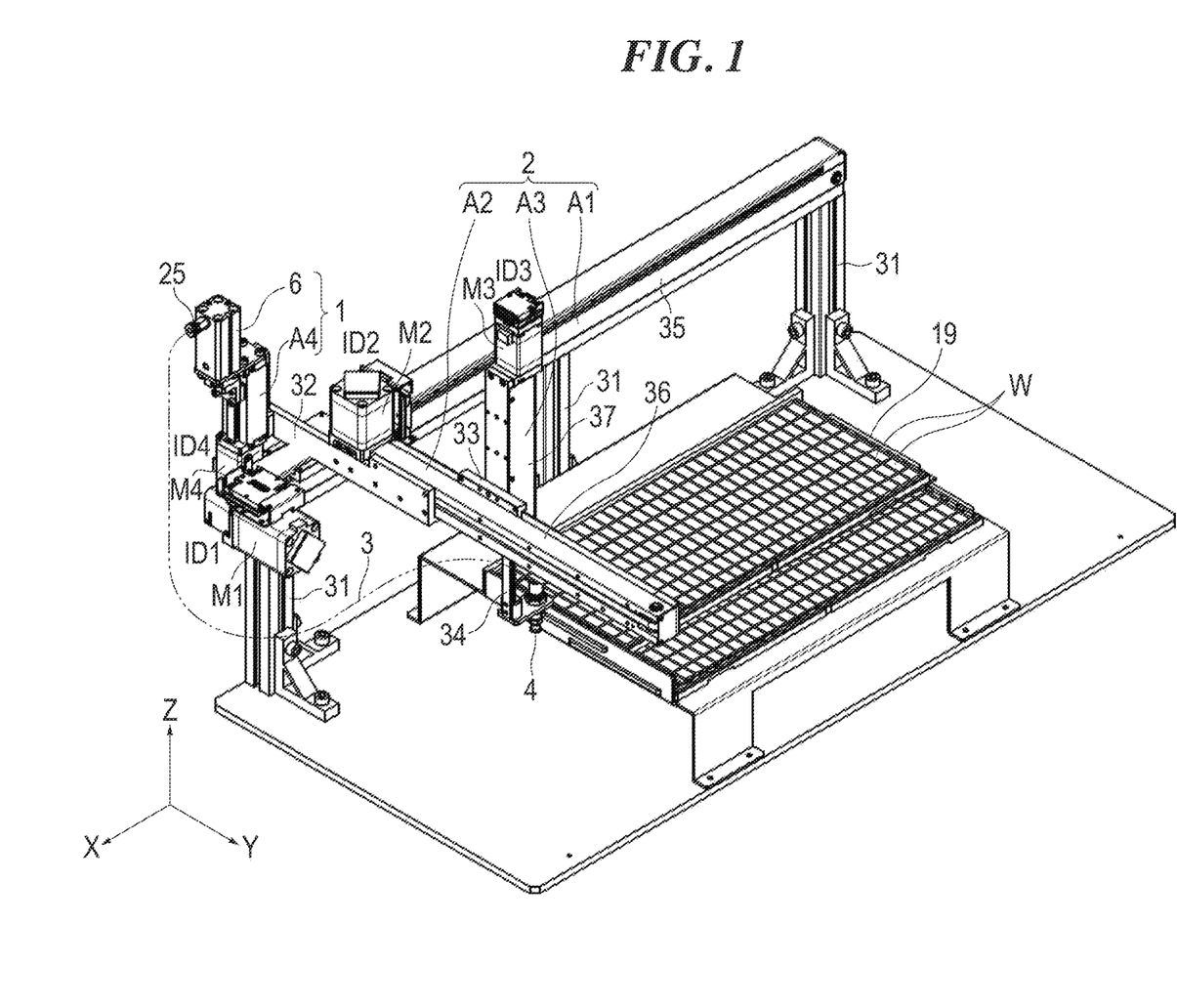
FIG. 1 is a perspective view of an air pump system of an embodiment of the present invention.

FIG. 1 is a perspective view of an air pump system of an embodiment of the present invention. The air pump system of the embodiment includes an air pump apparatus 1 and a three-axis robot 2. The three-axis robot 2 moves a suction pad 4 or an air chuck 5 (refer to FIGS. 6A and 6B) connected to the air pump apparatus 1 via a hose 3 in directions of three axes: X, Y, and Z axes. For convenience of description, the configuration of the air pump system is described below, using the X-, Y-, and Z-axis directions (the direction where an electric actuator A4 of the air pump apparatus 1 is operated is the Z-axis direction) illustrated in FIG. 1.

Figure 2:
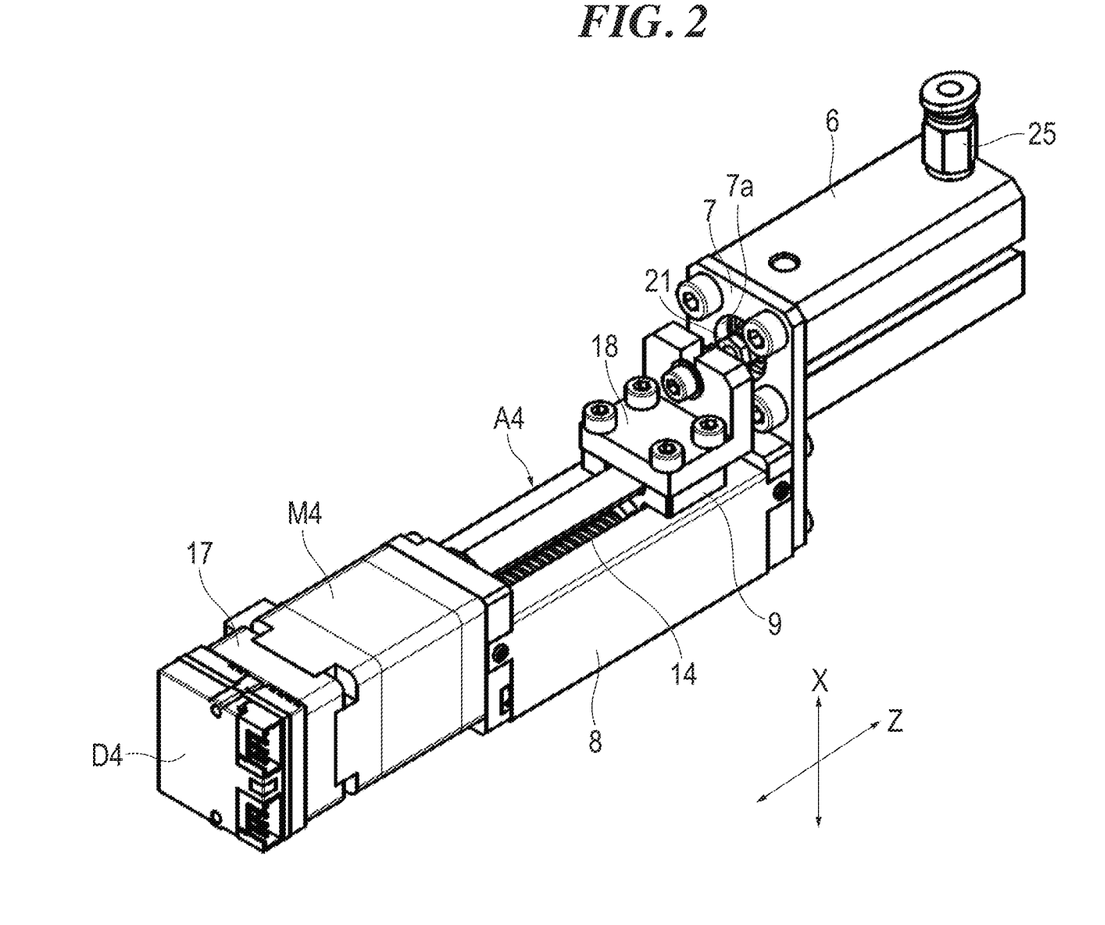
FIG. 2 is a perspective view of an air pump apparatus of an embodiment of the present invention.
Figure 3:
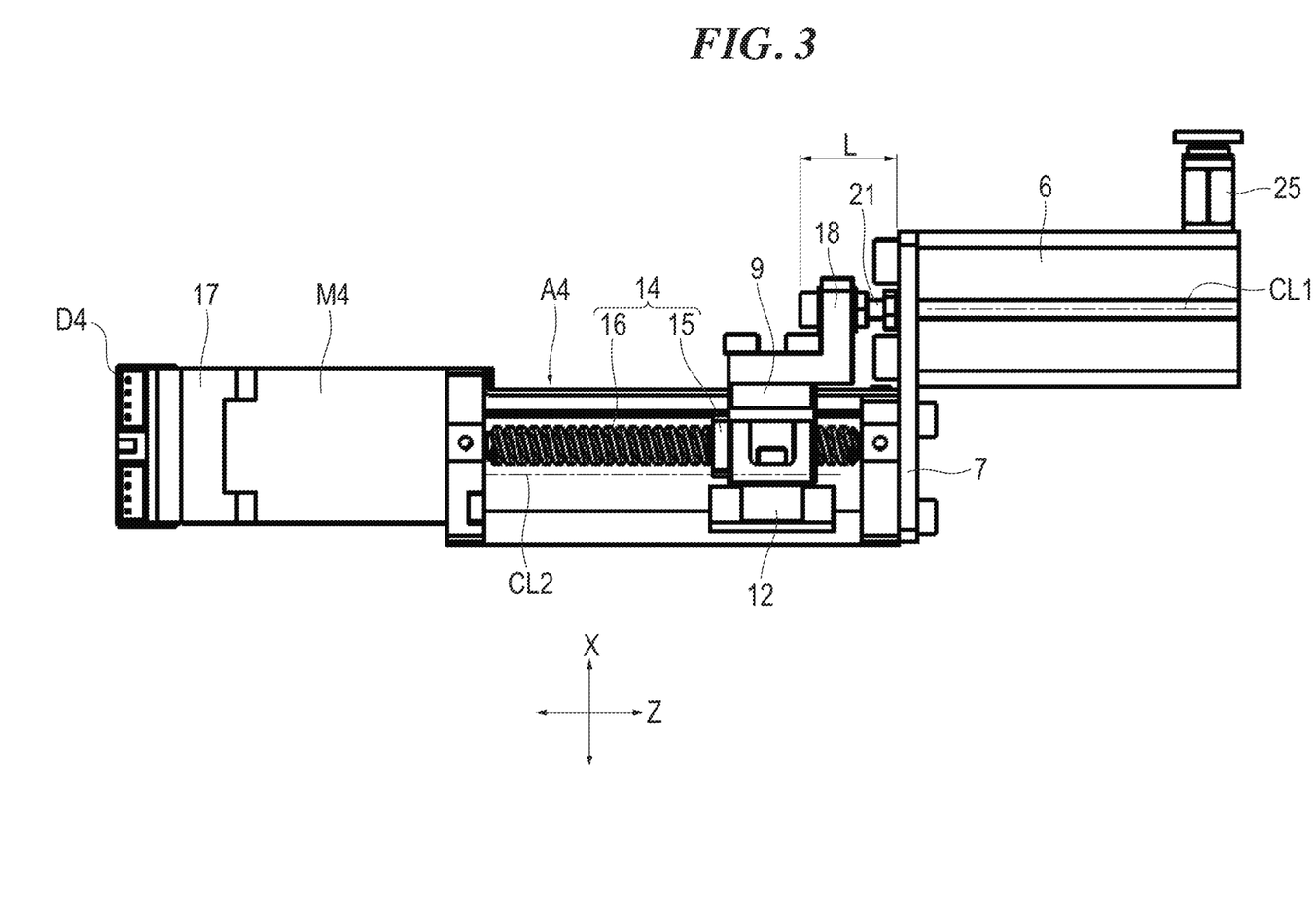
FIG. 3 is a side view of the air pump apparatus of the embodiment.

The configuration of the air pump apparatus 1 is as described below. FIG. 2 illustrates a perspective view of the air pump apparatus 1, and FIG. 3 illustrates a side view of the air pump apparatus 1. As illustrated in FIG. 2, the air pump apparatus 1 includes the electric actuator A4 (hereinafter simply referred to as the actuator A4), and an air cylinder 6 connected to an end of the actuator A4 via a connecting plate 7 as a connecting member. The actuator A4 includes an electric motor M4, an actuator body 8 to which the electric motor M4 is attached, a slider 9 that is supported by the actuator body 8 in such a manner as to be linearly movable in the Z-axis direction, and a screw device 14 as a motion conversion mechanism that converts the rotation of an output shaft of the electric motor M4 into the linear motion of the slider 9. The electric motor M4 is rotated to move the slider 9 linearly in the Z-axis direction with respect to the actuator body 8.

Figure 4:
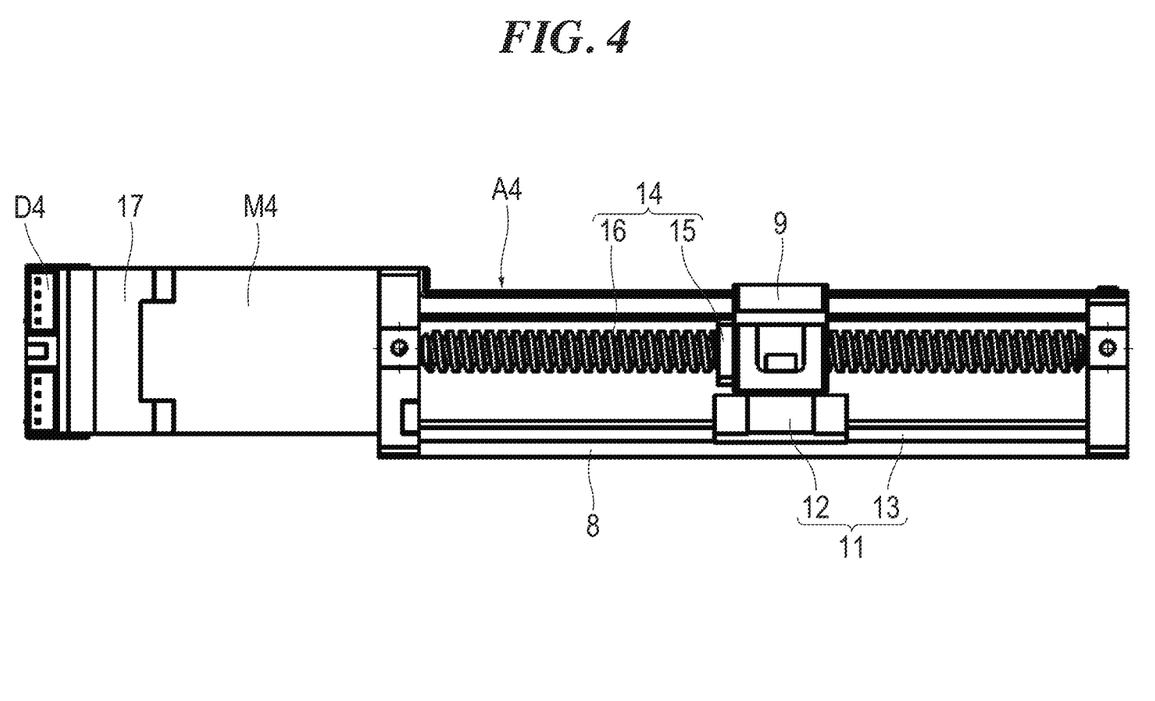
FIG. 4 is a side view of an electric actuator of the air pump apparatus of the embodiment.

FIG. 4 illustrates a side view of the actuator A4 in a state where a cover has been removed. A linear guide 11 that guides the slider 9 to move linearly is placed in the actuator body 8. The linear guide 11 includes a track member 13 attached to the actuator body 8, and a slide base 12 that moves linearly along the track member 13. Multiple rolling elements are interposed between the track member 13 and the slide base 12 in such a manner as to be capable of rolling motion. A circulation path that circulates the multiple rolling elements is provided in the slide base 12. The multiple rolling elements circulate in the circulation path with the movement of the slide base 12 with respect to the track member 13. The slider 9 is attached to the slide base 12 via the screw device 14. The linear motion of the slider 9 is guided by the linear guide 11 via the screw device 14.

A nut 15 of the screw device 14 is fixed to the slider 9. A screw shaft 16 of the screw device 14 is threadedly engaged with the nut 15. It is also possible to interpose multiple balls between a screw groove of the screw shaft 16 and a screw groove of the nut 15 in such a manner as to be capable of rolling motion. The screw shaft 16 is connected to the output shaft of the electric motor M4. The electric motor M4 rotates the screw shaft 16 to linearly move the slider 9 fixed to the nut 15.

A rotary encoder 17 that detects the rotation position of the electric motor M4 is mounted on the electric motor M4. The rotary encoder 17 detects the rotation position of the electric motor M4, and by extension the position of the slider 9 in the Z-axis direction. As described below, a piston 22 (refer to FIG. 5) of the air cylinder 6 is connected to the slider 9. Accordingly, the position of the slider 9 is detected to enable the detection of the position of the piston 22. Moreover, a control device D4 that controls the electric motor M4 is attached to the electric motor M4. The control device D4 includes a driver R4 that supplies electric power to the electric motor M4, and a control unit C4 that transmits a command to the driver R4 (refer to FIG. 7). The control device D4 controls the electric motor M4 on the basis of a signal from the rotary encoder 17 in such a manner that the position of the slider 9 agrees with a command of the control unit C4. It is also possible to provide a linear encoder that detects the position of the slider 9 instead of the rotary encoder 17.

As illustrated in FIG. 3, the air cylinder 6 is attached to the end of the actuator A4 in the Z-axis direction via the plate-shaped connecting plate 7. One end of the actuator body 8 is fixed to one surface of the connecting plate 7 in the Z-axis direction, and one end of the air cylinder 6 is cantilevered on the other surface of the connecting plate 7 in the Z-axis direction.

Figure 5:
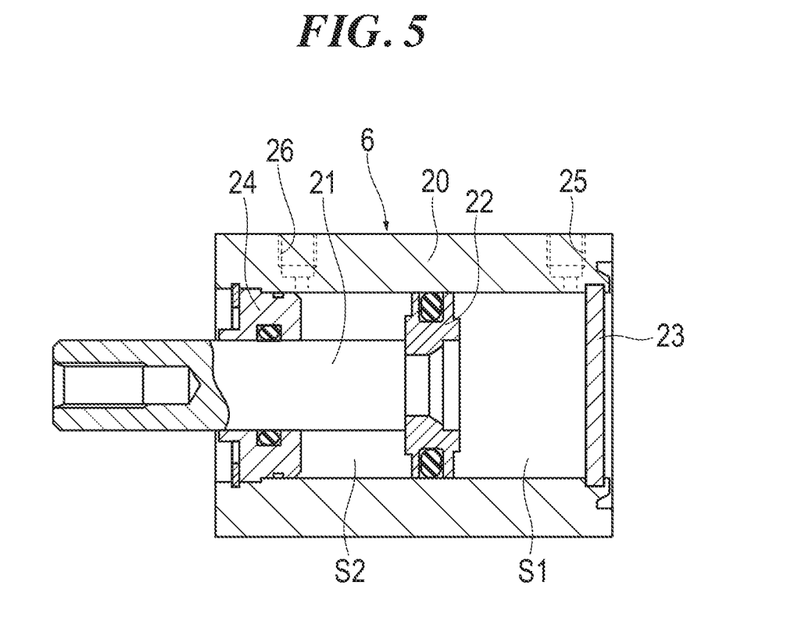
FIG. 5 is a cross-sectional view of an air cylinder of the air pump apparatus of the embodiment.

FIG. 5 illustrates a cross-sectional view of the air cylinder 6 along the Z-axis direction. The air cylinder 6 includes a main body 20 having a cylindrical piston housing space therein, the piston 22 that reciprocates in the main body 20, a piston rod 21 fixed to the piston 22, a cover 23 that covers one end of the main body 20, and a rod cover 24 that covers the other end of the main body 20 in such a manner that the piston rod 21 can slide. The inside of the air cylinder 6 is divided by the piston 22 into a first chamber S1 and a second chamber S2. Inlet and outlet ports 25 and 26 are provided to the first chamber S1 and the second chamber S2. The suction pad 4 or the air chuck 5 is connected to the inlet and outlet port 25 of the first chamber S1 via the flexible hose 3 (refer to FIG. 1).

As illustrated in FIG. 3, the movement directions of the piston rod 21 and the slider 9 of the actuator A4 are parallel. When viewed from the side, the air cylinder 6 and the actuator A4 are offset in the X-axis direction (in other words, a center line CL1 in the vertical direction of the air cylinder 6 and a center line CL2 in the vertical direction of the actuator A4 are displaced in the X-axis direction). The piston rod 21 and the actuator A4 overlap by a length L in the Z-axis direction. FIG. 3 illustrates a position where the piston rod 21 is contracted. When the piston rod 21 is at an extended position, the length L is increased. As illustrated in FIG. 2, a hole 7a through which the piston rod 21 of the air cylinder 6 passes is opened in the connecting plate 7. A distal end of the piston rod 21 is connected to the slider 9 via an L-shaped bracket 18. When the slider 9 moves linearly, the piston 22 moves linearly.

Figure 6A:
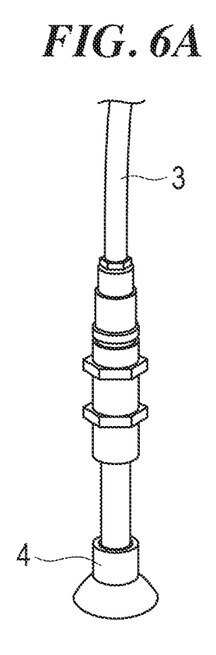
FIGS. 6A and 6B are perspective views of pneumatic devices connected to the air pump apparatus of the embodiment (FIG. 6A is a perspective view of a suction pad, and FIG. 6B is a perspective view of an air chuck).
Figure 6B:
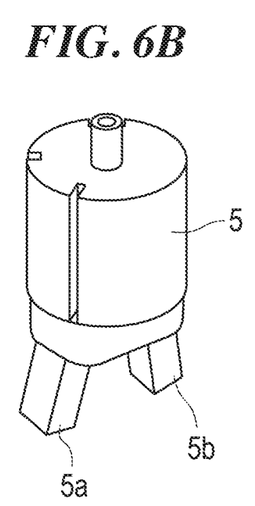

FIGS. 6A and 6B illustrate pneumatic devices that are operated by the air pump apparatus 1. For example, the suction pad 4 illustrated in FIG. 6A and the air chuck 5 illustrated in FIG. 6B can be used as pneumatic devices. The suction pad 4 creates a vacuum in it to adhere to a workpiece, and also destroys the vacuum in it to release the workpiece. The internal pressure of the hose 3 connected to the suction pad 4 is measured to enable the detection of whether or not the suction pad 4 is adhering to the workpiece. For example, the air chuck 5 causes an internal piston to reciprocate with compressed air as a drive source, and converts the reciprocation of the piston into the opening and closing of a pair of fingers 5a and 5b. A pressure generated on the pair of fingers 5a and 5b is measured to enable the detection of whether or not the pair of fingers 5a and 5b is holding the workpiece.

As illustrated in FIG. 5, when the actuator A4 moves the piston 22 in one direction toward the rod cover 24, negative pressure is generated in the first chamber S1, and positive pressure in the second chamber S2. A vacuum is created in the suction pad 4 by the negative pressure of the first chamber S1. Accordingly, the suction pad 4 can adhere to a workpiece W (refer to FIG. 1) on a tray 19. At this point in time, the compressed air is evacuated from the inlet and outlet port 26 of the second chamber S2. Contrary to this, when the actuator A4 moves the piston 22 in the other direction toward the cover 23, positive pressure is generated in the first chamber S1, and negative pressure in the second chamber S2. The positive pressure of the first chamber S1 destroys the vacuum in the suction pad 4. Accordingly, the suction pad 4 can release the workpiece W on the tray 19. At this point in time, atmospheric air is sucked from the inlet and outlet port 26 into the second chamber S2. In the embodiment, the suction pad 4 or the air chuck 5 is connected to only the inlet and outlet port 25 of the first chamber S1. However, the suction pad 4 or the air chuck 5 can also be connected to each of the inlet and outlet ports 25 and 26 of the first chamber S1 and the second chamber S2.

As illustrated in FIG. 1, the three-axis robot 2 transfers the suction pad 4 or the air chuck 5 to a predetermined position. The configuration of the three-axis robot 2 is as described below. The three-axis robot 2 includes an X-axis actuator A1 fixed to a support 31, a Y-axis actuator A2 fixed to a slider 32 of the X-axis actuator A1, and a Z-axis actuator A3 fixed to a slider 33 of the Y-axis actuator A2. The axis actuators A1 to A3 include actuator bodies 35, 36, and 37 that are long and slender in one axis direction, electric motors M1, M2, and M3 attached to the actuator bodies 35, 36, and 37, sliders 32, 33, and 34 that are supported by the actuator bodies 35, 36, and 37 in such a manner as to be linearly movable in one axis direction, and motion conversion mechanisms that convert the rotation of output shafts of the electric motors M1, M2, and M3 into the linear motion of the sliders 32, 33, and 34. The motion conversion mechanism is configured including, for example, a belt and a pulley, a screw shaft and a nut, or a rack and a pinion.

The suction pad 4 or the air chuck 5 is attached to the slider 34 of the Z-axis actuator A3. The air pump apparatus 1 is attached to the slider 32 of the X-axis actuator A1 to reduce a load on the Z-axis actuator A3. When viewed from the X-axis direction, the Y-axis actuator A2 is attached to one side of the slider 32 of the X-axis actuator A1, and the air pump apparatus 1 to the other side, to balance the moment.

Figure 7:
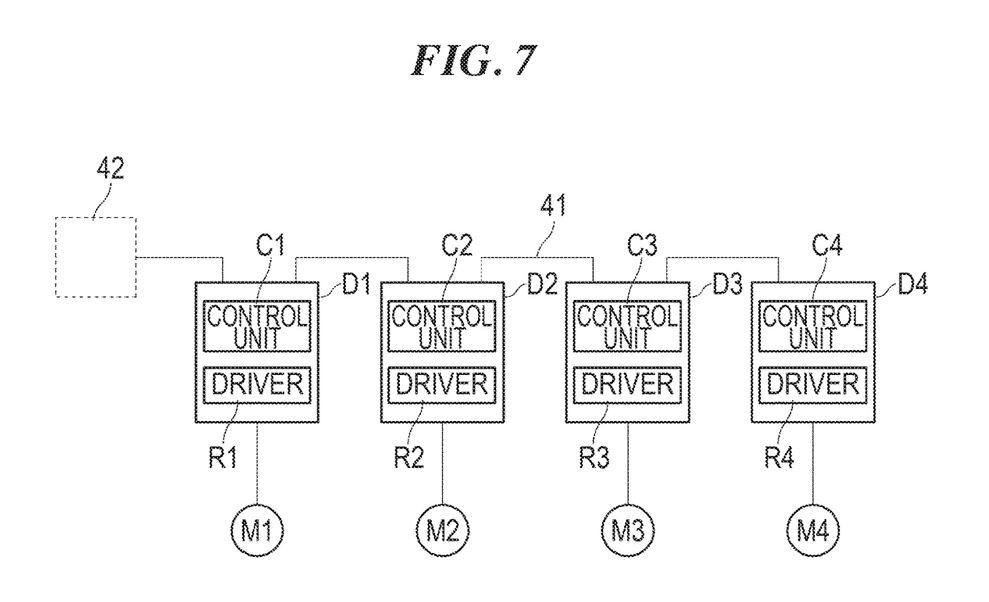
FIG. 7 is a diagram illustrating the configuration of a control system of the air pump system of an embodiment of the present invention.

The configurations of the control device D4 that controls the air pump apparatus 1, and control devices D1 to D3 that control the axis actuators A1 to A3 of the three-axis robot 2 are as described below. As illustrated in FIG. 7, the control device D4 includes the driver R4 that supplies electric power to the electric motor M4, and the control unit C4 that transmits a command to the driver R4. The control devices D1 to D3 include drivers R1 to R3 that supply electric power to the electric motors M1 to M3, and control units C1 to C3 that transmit commands to the drivers R1 to R3. The control units C1 to C4 of the control devices D1 to D4 are configured including a processor and a program executed thereby.

The control devices D1 to D4 are connected in series by a daisy chain 41. The control devices D1 to D4 can communicate with each other by a CAN (Controller Area Network). ID1 to ID4 are set for the control devices D1 to D4 to identify the control devices D1 to D4. The control units C1 to C3 store their corresponding IDs therein. A power line is connected to the drivers R1 to R4 of the control devices D1 to D4 to supply electric power to the drivers R1 to R4.

In a known general control system, a plurality of drivers is connected to one master control device, and the one master control device transmits a command to the plurality of drivers. In contrast, in a control system of the embodiment, a master control device that is responsible for control of the entire system is not present, and the control of the entire system is distributed and allocated to the control devices D1 to D4. The control units C1 to C4 of the control devices D1 to D4 can also transmit a command to their own drivers R1 to R4 of the control device D4 itself, and can also transmit a command to the drivers R1 to R4 of the other control devices D1 to D4.

A script rewriting device 42, such as a PC, that rewrites a script (a program for controlling the actuators A1 to A4) can be connected to the control devices D1 to D4 via the CAN communication. Naturally, when the script is not required to be rewritten, there is no need to connect the script rewriting device 42 and the control devices D1 to D4.

Figure 8:
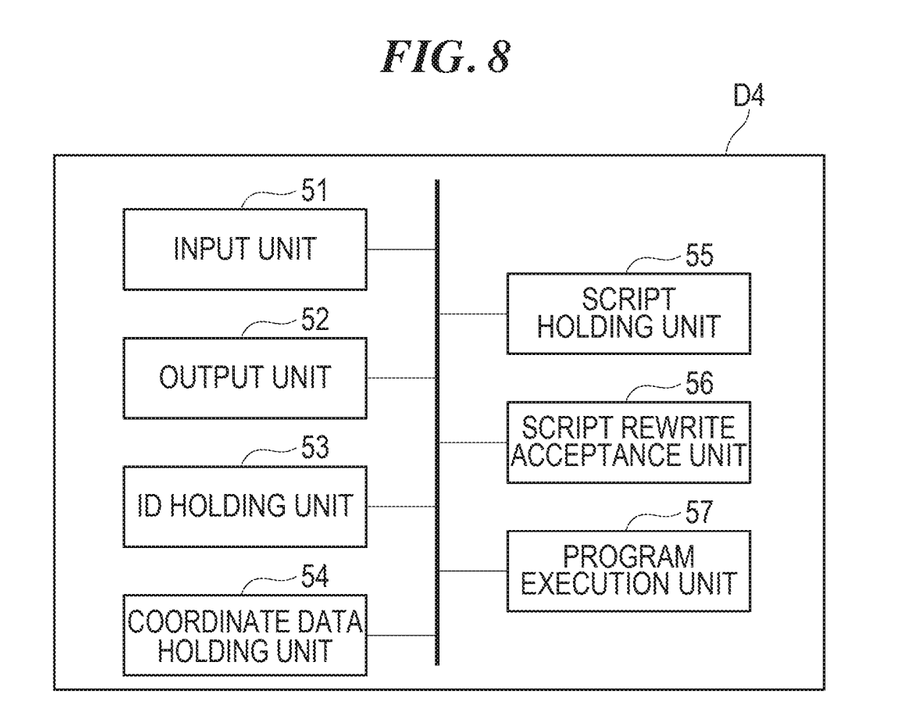
FIG. 8 is a functional block diagram of a control device of the control system illustrated in FIG. 7.

FIG. 8 illustrates a functional block diagram where functions achieved in the control unit C4 of the control device D4, which represents the control devices D1 to D4, are visualized. The functions are achieved by hardware such as a processor, an input/output port, and a memory of the control unit C4, and a program executed by the processor of the control unit C4.

An input unit 51, an output unit 52, an ID holding unit 53, a coordinate data holding unit 54, a script holding unit 55, a script rewrite acceptance unit 56, an a program execution unit 57 are formed in the control unit C4 of the control device D4. Data required to control the drive of the actuator A4 handled directly by the control device D4 is input into the input unit 51 via the input port of the control device D4. As described below, a command to the actuator A4 is also input into the input unit 51 from the control devices (that is, the control devices D1 to D3) other than the control device D4. Contrary to the input unit 51, the output unit 52 outputs a command to drive the actuators A1 to A3 associated directly with the control devices (that is, the control devices D1 to D3) except the control device D4 to the control units C1 to C3 of the control devices D1 to D3 via the output port of the control device D4. Therefore, the command output from the output unit 52 of the control unit C4 of the control device D4 is input into the input units 51 of the control units C1 to C3 of the other control devices D1 to D3. The ID holding unit 53 holds an identification ID set for each of the control devices D1 to D4 as described above. A relevant identification ID (ID4 in the case of the control device D4) is held in the memory of the control device D4. The coordinate data holding unit 54 stores coordinate data that can be obtained by the actuator A4 related to the drive of the actuator A4. A command to directly designate the coordinates of a travel destination of the actuator A4 is prepared in the program in the script holding unit 55 described below. The coordinate data held in the coordinate data holding unit 54 is used as an argument of the command. In the embodiment, for example, 255 pieces of coordinate data at the maximum are held in the coordinate data holding unit 54.

The script holding unit 55 holds, in the memory in the control device D4, a script including a program related to control over the drive of the actuator A4 associated directly with the control device D4, or a program related to control over the drive of the actuators A1 to A3 associated directly with the control devices D1 to D3 other than the control device D4 itself. Although the details of the script are described below, of special note in the embodiment, the control device D4 can also issue a command to the actuators A1 to A3 associated directly with the control devices D1 to D3 other than the control device D4 itself. When the script is rewritten by the script rewriting device 42 from the outside of the control system, the script rewrite acceptance unit 56 accepts the rewrite instruction. The program execution unit 57 executes the program (script) for drive control held by the script holding unit 55, and controls the drive of the actuator A4 in reality. The program allows the actuators A1 to A4 targeted for driving to be designated with the identification IDs of the control devices D1 to D4. Consequently, the actuators targeted for drive control by the program execution unit 57 are all the actuators A1 to A4 connected by the daisy chain.

FIG. 8 illustrates function blocks related to the control device D4. However, the other control devices D1 to D3 also have essentially similar function blocks. Therefore, as the entire control system, it is possible to transmit a command, via the input unit 51 and the output unit 52 of each of the control units C1 to C4 of the control devices D1 to D4, to not only the actuator A1, A2, A3, or A4 associated directly with the control device D1, D2, D3, or D4 itself but also all or a part of the rest of the control devices D1 to D4 except the control device D1, D2, D3, or D4 itself.

Figure 9:
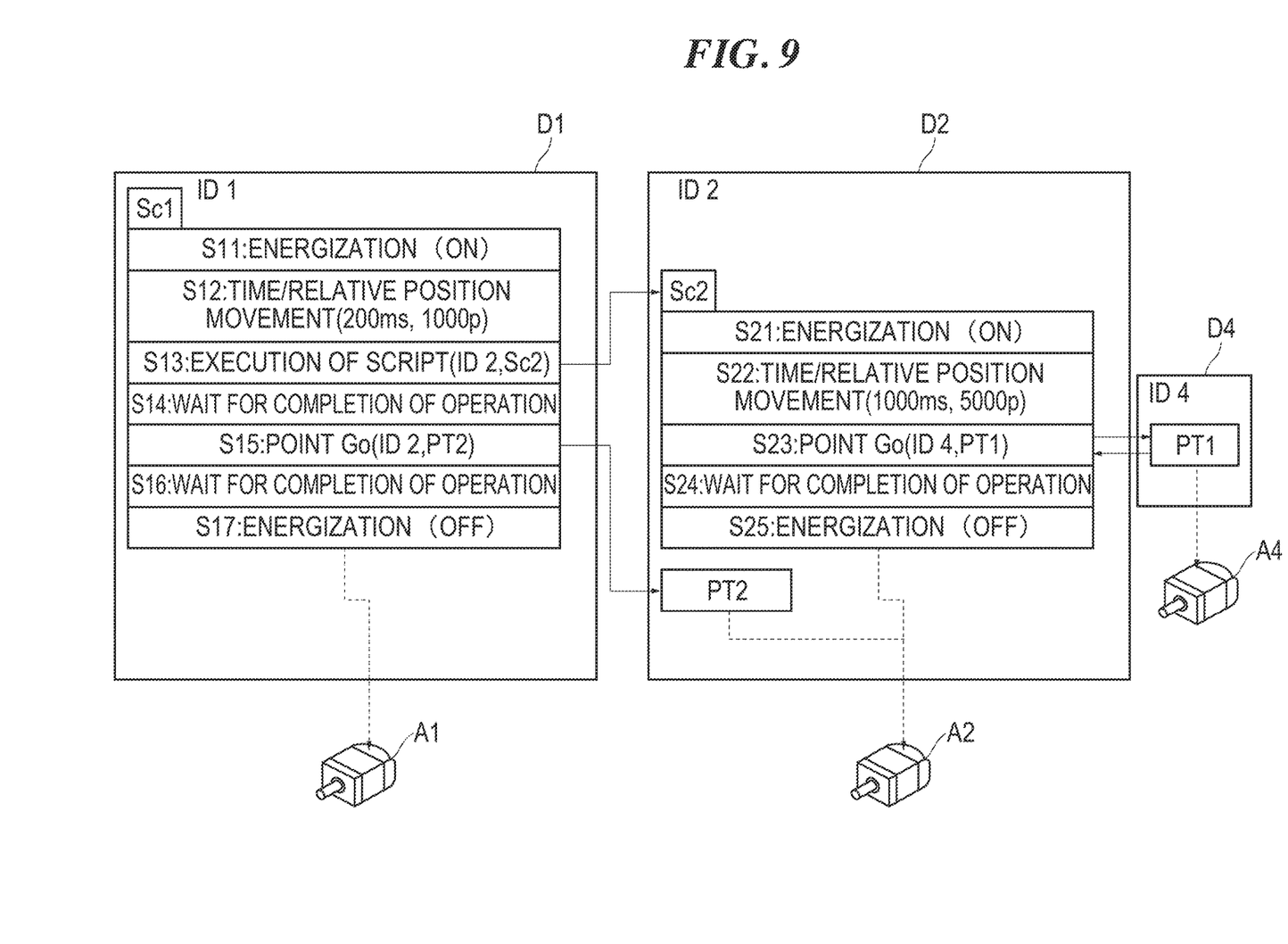
FIG. 9 is a diagram illustrating the flow of control of an actuator that is performed in the control system illustrated in FIG. 7.

The control over the drive of the actuators A1, A2, and A4 is described on the basis of FIG. 9. For simplification of description, the control over the drive of the actuators A1, A2, and A4 is mentioned in FIG. 9. FIG. 9 is a diagrammatic illustration of scripts of the control units C1 and C2 of the control devices D1 and D2, and point tables of the control units C2 and C3 of the control devices D2 and D3. FIG. 9 does not illustrate a point table for the control device D1, and a script for the control device D4. However, this is for convenience of description of the embodiment. Each of the control devices D1, D2, and D4 may include a script and a point table as necessary. The script is a program group where a control program for driving the actuator A1, A2, or A4 is described over a plurality of lines. Eight scripts are stored at the maximum in the control unit C1, C2, or C4 of one control device D1, D2, or D4. Each script includes a control program of, for example, 255 lines at the maximum. Moreover, the point table is a table including a combination of a travel position and a travel time required for the travel, when the actuator A1, A2, or A4 is driven. In the embodiment of the invention of the present application, the point table can include, for example, 255 combinations of the travel position and the travel time at the maximum. The script holding unit 55 holds the scripts, and the coordinate data holding unit 54 holds the point table.

A script Sc1 executed by the control unit C1 of the control device D1 illustrated in FIG. 9 is a script including a control program of seven lines from S11 to S17. A script Sc2 executed by the control unit C2 of the control device D2 is a script including a control program of five lines from S21 to S25. When the script Sc1 is executed, an energization process is performed first in step S11. The energization process is a process that is performed only on the actuator A1 associated directly with the control device D1 where the process is performed. Hence, in the energization process, ID information of the control device D1 associated directly with the actuator A1 targeted for the process is designated. Therefore, step S11 allows the actuator A1 to be energized and activated. Next, in step S12, a time/relative position movement process is performed. The relative position movement here indicates relative movement with reference to the position at this point in time. The process is also performed only on the actuator A1 associated directly with the control device D1 as in the energization process. Hence, a time and a travel distance (the number of pulses) related to the relative position movement are set as arguments of the process. In step S12 of FIG. 9, the process of performing a relative movement of 1000 p (pulses) in 200 ms time is performed on the actuator A1.

Next, in step S13, a script execution process is performed. The process is the process of causing not only the control device itself (the control device D1 in the case of the example) but also the control unit C2 of another control device D2 to execute a script. Accordingly, ID2 of the control device D2 that holds the script to be executed and a number of the script to be executed by the control device D2 designated by ID2 are set as arguments of the process. In the embodiment illustrated in FIG. 9, the script Sc2 of the control unit C2 of the control device D2 identified by ID2 is executed in step S13. The next step S14 is the step of performing an operation completion wait process. The operation completion wait process is the process of waiting without proceeding to the next step until the process that has been performed up to this time (the process of step S13 in this case) is complete. Therefore, step S13 allows the script Sc2 to be executed and the processes of step S15 and the subsequent steps are not performed until the execution of the script Sc2 is complete.

The script Sc2 is briefly described here. As illustrated on the right side of FIG. 9, the script Sc2 is a script including a control program of five lines from S21 to S25. In step S21, an energization activation process is performed on the actuator A2 associated directly with the control device D2. In step S22, the time/relative position movement process (a relative movement of 5000 p in 1000 ms time) is similarly performed on the actuator A2. Next, in step S23, a process called "point Go" is performed. The "point Go" process allows the movement process to be performed on the actuator A4, in accordance with a designated point table, in the actuator A4 associated with the control device D4 having a designated ID. In the process, the control device D4 other than the control device D2 itself can be designated by the ID. Accordingly, the drive process in accordance with the point table can also be performed on the actuator A4 associated directly with the control device D4 other than the control device D2 itself. The point table is set for each of the control devices D1 to D4, which makes it easy for a user to grasp the driving states of the actuators A1 to A4 associated directly with the control devices D1 to D4, and facilitates the control over the drive of the actuators A1 to A4. In step S23, ID4 being the ID of the control device D4 and PT1 that designates the point table of the control device D4 are set as arguments of the "point Go" process. Consequently, the drive of the actuator A4 associated directly with the control device D4 is controlled from the control device D2 side in accordance with the designated point table PT1. The point table PT1 represents the absolute position and arrival time of the actuator A4 in table form. Up to 255 points can be recorded at the maximum in the point table PT1.

Next, in step S24, the process of waiting until the "point Go" process of step S23 is complete is performed. When the "point Go" process is complete, the process shifts to step S25 to perform an energization interruption process on the actuator A2. The control over the drive of the actuator A2 specified by the script Sc2 is completed by a series of processes up to this point. As described above, the execution of Sc2 is started by step S13 included in the script Sc1 on the control device D1 side. Accordingly, when a series of processes by the script Sc2 is complete, the process of step S15 is performed after the completion of the operation is confirmed in step S14.

In step S15, the above-mentioned process called "point Go" is performed. ID2 being the ID of the control device D2 and PT2 that designates the point table of the control device D2 are set here as arguments of the "point Go" process. Consequently, the drive of the actuator A2 associated directly with the control device D2 is controlled from the control device D1 side in accordance with the point table PT2.

After step S15, the operation completion wait process is performed in step S16. Therefore, the processes of S17 and the subsequent steps are not performed until the "point Go" process is complete in step S15. When the control device D2 informs the control device D1 that the "point Go" process of the actuator A2 is complete, the completion of the operation is judged in step S16, and then the process of step S17 is performed. In step S17, the energization interruption process is performed on the actuator A1.

In this manner, in the control over the drive of the actuator of the embodiment, the control device D1 can control not only the drive of the actuator A1 associated directly with the control device D1 itself but also the drive of the actuator A2 via the control device D2 connected by the daisy chain as illustrated in the processes of steps S13 and S15. On the other hand, the control device D2 can also control not only the drive of the actuator A2 associated directly with the control device D2 itself but also the drive of the actuator A4 via the control device D4 connected by the daisy chain as illustrated in the process of step S23. In other words, a command to control the drive of the actuator A4 can be transmitted to the other control device D4 except the control device D2 itself. Consequently, the control system is constructed in such a manner that each of the control devices D1 to D4 included in the system can control the drive of all the actuators A1 to A4.

The configuration of the air pump system of the present invention has been described in detail above. The air pump system of the embodiment has the following effects:

The electric actuator A4 operates the air cylinder 6 to enable generation of negative pressure and/or positive pressure of air and electric operation of the suction pad 4 or the air chuck 5. A large-scale compressor for operating the suction pad 4 or the air chuck 5 is not required; therefore, the air pump apparatus 1 can be made compact.

An encoder 17 is mounted on the electric actuator A4 to control the position of the piston 22 of the air cylinder 6. Accordingly, the magnitude of negative pressure and/or positive pressure generated on the air cylinder 6 can be adjusted. Therefore, the suction strength of the suction pad 4 or the holding strength of the air chuck 5 can be adjusted to a workpiece.

When the air cylinder 6 and the electric actuator A4 are viewed from the side, the piston rod 21 of the air cylinder 6 and the electric actuator A4 are connected via the connecting plate 7 in such a manner as to be offset. The piston rod 21 and the actuator body 8 overlap with each other. Accordingly, the air pump apparatus 1 can be made compact in the Z-axis direction.

The electric actuator A4 is configured including the electric motor M4, the actuator body 8, the slider 9 that is supported by the actuator body 8 in such a manner as to be linearly movable, and the screw device 14 that converts the rotation of the output shaft of the electric motor M4 into the linear motion of the slider 9. Accordingly, the function of the electric actuator A4 and the function of the air cylinder 6 can be separated. Therefore, it becomes easy to change the types and sizes of the electric actuator A4 and the air cylinder 6. It also becomes easy to change an air discharge amount. Moreover, the screw device 14 is used as the motion conversion mechanism. Accordingly, the piston 22 can be moved in defiance of negative pressure and positive pressure generated on the air cylinder 6.

The air pump apparatus 1 is combined with the actuators A1 to A3 of at least one axis. Accordingly, the suction pad 4 or the air chuck 5 can be controlled as in control of the actuators A1 to A3 of at least one axis. The necessity of a control device specifically designed to control the pneumatic device is eliminated. Accordingly, the control system can be easily and efficiently constructed.

The control unit C4 of the control device D4 that controls the air pump apparatus 1 can also transmit a command to the drivers R1 to R3 of the other control devices D1 to D3 in addition to the driver R4 of the control device D4 itself. Moreover, the control units C1 to C3 of the control devices D1 to D3 that control the actuators A1 to A3 of at least one axis can also transmit a command to their own drivers R1 to R3 and also the driver R4 of the other control device D4. Accordingly, the control system can be more easily and efficiently constructed.

The present invention is not limited to the concretization of the embodiment, and can be concretized in various embodiments within the scope that does not change the purport of the present invention. For example, the air pump apparatus is combined with the three-axis robot in the air pump system of the embodiment, but can also be combined with a single-axis or two-axis robot, or three or more axis robot. Moreover, a plurality of air pump apparatuses is provided to enable a plurality of suction pads or air chucks to hold a workpiece.

In the embodiment, the suction pad or air chuck is used as the pneumatic device. However, the application of the pneumatic device is not limited to holding a workpiece. For example, an air cylinder or air rotary actuator can also be used as the pneumatic device.

The present description is based on JP 2015-125573 A filed on Jun. 23, 2015, the entire contents of which are incorporated herein.

REFERENCE SIGNS LIST

1 Air pump apparatus
2 Three-axis robot (actuator of at least one axis)
4 Suction pad (pneumatic device)
5 Air chuck (pneumatic device)
6 Air cylinder
7 Connecting plate (connecting member)
9 Slider (movable body)
14 Screw device (motion conversion mechanism)
17 Rotary encoder (encoder)
21 Piston rod
22 Piston
A1 X-axis actuator
A2 Y-axis actuator
A3 Z-axis actuator
A4 Electric actuator
D1 to D4 Control device
C1 to C4 Control unit
R1 to R4 Driver
M1 to M4 Electric motor
W Workpiece

The invention claimed is:

1. An air pump system comprising:
   an air pump apparatus comprising:
      an air cylinder comprising a built-in piston, and a first chamber and a second chamber which are separated by the piston, the first chamber and the second chamber each comprising a single inlet and outlet port that both sucks and evacuates air;
      an electric actuator; and
      an electric motor;
      wherein the electric actuator moves the piston linearly and relatively to the air cylinder, using the electric motor as a drive source, and wherein
      air under negative pressure or positive pressure generated by the electric actuator causing the piston to move linearly is used to operate a pneumatic device connected to the inlet and outlet port; and
   an actuator of at least one axis configured to move the pneumatic device in at least one-axis direction, using a second electric motor as a drive source.

2. The air pump system according to claim 1, wherein the electric actuator further comprises an encoder for controlling the position of the piston mounted thereon.

3. The air pump system according to claim 2, wherein,
   the air cylinder and the electric actuator are connected via a connecting member in such a manner as to be offset in a direction perpendicular to a longitudinal extension of the air cylinder and the electric actuator, and
   a piston rod to which the piston of the air cylinder is fixed and the electric actuator overlap with each other.

4. The air pump system according to claim 3, wherein the electric actuator comprises:
   an actuator body to which the electric motor is attached,
   a movable body supported by the actuator body in such a manner as to be linearly movable, and
   a screw device configured to convert rotation of an output shaft of the electric motor into linear motion of the movable body.

5. The air pump system according to claim 2, wherein the electric actuator comprises:
   an actuator body to which the electric motor is attached,
   a movable body supported by the actuator body in such a manner as to be linearly movable, and
   a screw device configured to convert rotation of an output shaft of the electric motor into linear motion of the movable body.

6. The air pump system according to claim 1,
   wherein the air cylinder and the electric actuator are connected via a connecting member in such a manner as to be offset in a direction perpendicular to a longitudinal extension of the air cylinder and the electric actuator, and
   a piston rod to which the piston of the air cylinder is fixed and the electric actuator overlap with each other.

7. The air pump system according to claim 6, wherein the electric actuator comprises:
   an actuator body to which the electric motor is attached,
   a movable body supported by the actuator body in such a manner as to be linearly movable, and
   a screw device configured to convert rotation of an output shaft of the electric motor into linear motion of the movable body.

8. The air pump system according to claim 1, wherein the electric actuator comprises:
   an actuator body to which the electric motor is attached,
   a movable body supported by the actuator body in such a manner as to be linearly movable, and
   a screw device configured to convert rotation of an output shaft of the electric motor into linear motion of the movable body.

9. An air pump system comprising:
   an air pump apparatus comprising:
      an air cylinder comprising a built-in piston;
      an electric motor; and
      an electric actuator that moves the piston linearly and relatively to the air cylinder, using the electric motor as a drive source, wherein air under negative pressure or positive pressure generated by the electric actuator causing the piston to move linearly is used to operate a pneumatic device;
   an actuator of at least one axis that moves the pneumatic device in at least one-axis direction, using a second electric motor as a drive source;
   a first control device that controls the air pump apparatus; and
   a second control device that controls the actuator of at least one axis,
   wherein:
   the first control device comprises a first driver that supplies electric power to the electric motor of the air pump apparatus, and a first control unit that transmits a command to the first driver, and
   the second control device comprises a second driver that supplies electric power to the second electric motor of the actuator of at least one axis, and a second control unit that transmits a command to the second driver,
   the first control unit is also capable of transmitting a command to the second driver, and
   the second control unit is also capable of transmitting a command to the first driver.

* * * * *